United States Patent
Lowe et al.

(10) Patent No.: US 12,413,026 B2
(45) Date of Patent: Sep. 9, 2025

(54) MONITORING THE POSITION OF AN ELECTRICAL CONNECTOR

(71) Applicant: GM GLOBAL TECHNOLOGY OPERATIONS LLC, Detroit, MI (US)

(72) Inventors: Infane Lowe, Grand Blanc, MI (US); Lyall Kenneth Winger, Waterloo (CA); Aaron B. Bloom, Royal Oak, MI (US); Xinyu Du, Oakland Township, MI (US); James Morrison, Sebringville (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 316 days.

(21) Appl. No.: 18/083,804

(22) Filed: Dec. 19, 2022

(65) Prior Publication Data

US 2024/0204464 A1   Jun. 20, 2024

(51) Int. Cl.
*H01R 13/66* (2006.01)
*G01L 5/00* (2006.01)
*H01R 13/629* (2006.01)

(52) U.S. Cl.
CPC ....... *H01R 13/6683* (2013.01); *H01R 13/629* (2013.01); *G01L 5/00* (2013.01); *H01R 2201/26* (2013.01)

(58) Field of Classification Search
CPC .............. H01R 13/6683; H01R 13/629; H01R 2201/26; G01L 5/00
USPC ......................................................... 439/489
See application file for complete search history.

(56) References Cited

U.S. PATENT DOCUMENTS

| | | | | |
|---|---|---|---|---|
| 5,112,246 A | * | 5/1992 | Kawase | H01R 13/629 439/489 |
| 5,781,016 A | * | 7/1998 | Maeda | H01R 13/641 439/489 |
| 6,024,595 A | * | 2/2000 | Saba | H01R 13/641 439/352 |
| 7,384,300 B1 | * | 6/2008 | Salgado | H01R 13/7035 439/489 |
| 8,264,366 B2 | * | 9/2012 | Chamarti | H04Q 9/00 709/224 |
| 8,398,416 B2 | * | 3/2013 | Tseng | H01R 13/6658 439/660 |
| 9,601,879 B1 | | 3/2017 | Lin et al. | |
| 9,647,397 B2 | | 5/2017 | Du et al. | |
| 9,915,695 B2 | * | 3/2018 | Lee | G01R 31/69 |
| 10,547,146 B2 | * | 1/2020 | Brennan | H04L 12/10 |
| 11,133,625 B2 | * | 9/2021 | Brennan | H01R 43/26 |
| 11,495,921 B2 | * | 11/2022 | Brennan | H01R 24/64 |

(Continued)

*Primary Examiner* — Gary F Paumen
(74) *Attorney, Agent, or Firm* — CANTOR COLBURN LLP (57) ABSTRACT

An electrical connector is provided. The electrical connector includes a first housing having an outer surface and a second housing configured to receive the first housing, wherein the second housing includes an inner surface configured to contact the outer surface of the first housing. The electrical connector also includes a plurality of sensors configured to monitor a contact between the inner surface and the outer surface and a controller in communication with the plurality of sensors, wherein the controller is configured to determine a position of the first housing relative to the second housing.

20 Claims, 9 Drawing Sheets

(56) References Cited

U.S. PATENT DOCUMENTS

| | | | | |
|---|---|---|---|---|
| 11,705,678 | B2* | 7/2023 | Brennan | H01R 13/703 |
| | | | | 200/51 R |
| 11,996,659 | B2* | 5/2024 | Brennan | H01R 13/713 |
| 2013/0065428 | A1* | 3/2013 | Steeves | H01R 13/6683 |
| | | | | 439/488 |
| 2014/0187078 | A1* | 7/2014 | Zhou | H01R 13/6683 |
| | | | | 439/489 |

* cited by examiner

MONITORING THE POSITION OF AN ELECTRICAL CONNECTOR

INTRODUCTION

The disclosure relates to monitoring an electrical connector and, more particularly, to a system and method for monitoring a position of an electrical connector.

Various systems, such as vehicles, aircraft, marine vessels, building wiring, computers, electronics, robots, etc., often include many wires, connectors, terminals, and electrical harnesses that provide an electrical signal path for various systems, sub-systems, controllers, sensors, and actuators. For example, the electrical systems in a vehicle typically include a number of multi-terminal connectors that simultaneously connect a number of wires. In one multi-connector design, wires are electrically connected using gender-specific male and female terminals. The male terminals are inserted into the female terminals when the terminal housings are joined to make the electrical connections between the wires. Typically, the male terminal is held within the female terminal by a spring clip, which provides tension to assure electrical contact. The connector housing provides a secure terminal-to-terminal contact through various locking designs.

For the above described connectors, the male terminal is held within the female terminal under a certain amount of tension or friction with enough force to make the electrical connection, but also allow the terminal housings to be manually separated. Further, the male terminal is inserted into the female terminal a distance so that the male terminal and the female terminal make electrical contact along some defined length of the terminals. As a result of vehicle vibration and the like, the male terminal sometimes separates from the female terminal, where the terminal housings become separated. Once the male terminal is removed from the female terminal a certain amount, the terminal housings are disconnected and electrical connection between the male terminal and the female terminal is lost.

SUMMARY

In one exemplary embodiment, an electrical connector is provided. The electrical connector includes a first housing having an outer surface and a second housing configured to receive the first housing, wherein the second housing includes an inner surface configured to contact the outer surface of the first housing. The electrical connector also includes a plurality of sensors configured to monitor a contact between the inner surface and the outer surface and a controller in communication with the plurality of sensors, wherein the controller is configured to determine a position of the first housing relative to the second housing.

In addition to the one or more features described herein at least one of the plurality of sensors is disposed on the inner surface.

In addition to the one or more features described herein at least one of the plurality of sensors is disposed on the outer surface.

In addition to the one or more features described herein the plurality of sensors are electrical contacts and wherein the controller is configured to detect a connection between the electrical contacts.

In addition to the one or more features described herein the plurality of sensors are pressure sensors.

In addition to the one or more features described herein the controller is configured to transmit an alert based on a determination that the first housing is not fully inserted into the second housing.

In addition to the one or more features described herein a power source in communication with at least one of the plurality of sensors.

In one exemplary embodiment, a method for monitoring a position of an electrical connector having a second housing configured to receive a first housing is provided. The method includes receiving a first signal from a first sensor configured to monitor contact between an inner surface of the second housing and an outer surface of the first housing and receiving a second signal from a second sensor configured to monitor contact between an inner surface of the second housing and an outer surface of the first housing. The method also includes determining a position of the first housing relative to the second housing based on the first signal and the second signal.

In addition to the one or more features described herein the method also includes transmitting an alert based on a determination that the first housing is not fully inserted into the second housing.

In addition to the one or more features described herein the electrical connector is disposed in a vehicle.

In addition to the one or more features described herein the method also includes disabling at least one feature of the vehicle based on a determination that the first housing is not fully inserted into the second housing.

In addition to the one or more features described herein the first sensor is disposed closer to a rear inner surface of the second housing than the second sensor.

In addition to the one or more features described herein at least one of the first sensor and second sensor are disposed on the inner surface.

In addition to the one or more features described herein at least one of the first sensor and second sensor are disposed on the outer surface.

In addition to the one or more features described herein at least one of the first sensor and second sensor are electrical contacts.

In addition to the one or more features described herein at least one of the first sensor and second sensor are pressure sensors.

In one exemplary embodiment, a vehicle is provided. The vehicle includes an electrical system having an electrical connector. The electrical connector includes a first housing having an outer surface and a second housing configured to receive the first housing, wherein the second housing includes an inner surface configured to contact the outer surface of the first housing. The electrical connector also includes a plurality of sensors configured to monitor a contact between the inner surface and the outer surface and a controller in communication with the plurality of sensors, wherein the controller is configured to determine a position of the first housing relative to the second housing.

In addition to the one or more features described herein at least one of the plurality of sensors is disposed on the inner surface.

In addition to the one or more features described herein at least one of the plurality of sensors is disposed on the outer surface.

In addition to the one or more features described herein the plurality of sensors are electrical contacts and wherein the controller is configured to detect a connection between the electrical contacts.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

In exemplary embodiments, electrical connectors are provided that include mechanisms for monitoring the relative positions of terminal housings that are joined to make electrical connections. The mechanisms include multiple sensors that are disposed within the housings to detect that the terminal housings are not fully engaged with one another. In exemplary embodiments, multiple sensors, which may also be referred to herein as canary pins or voltage sensors, are placed at different locations within the terminal housing and are configured to monitor the relative positions of the first and second housing members. Based on the readings of the sensors, a determination can be made that the housing members have begun to separate from one another before a loss of the electrical connection provided by the electrical connector.

Figure 1A:
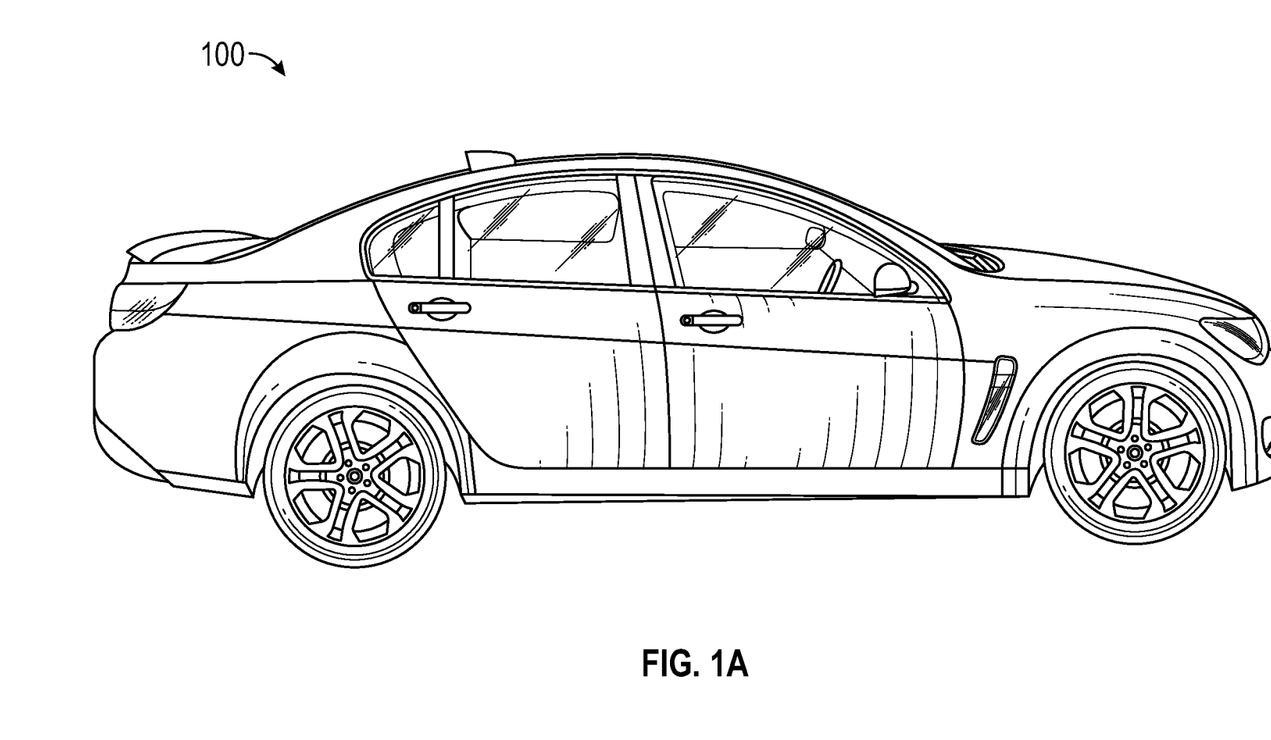
FIG. 1A is a schematic diagram of a vehicle for use in conjunction with one or more embodiments of the present disclosure.
Figure 1B:
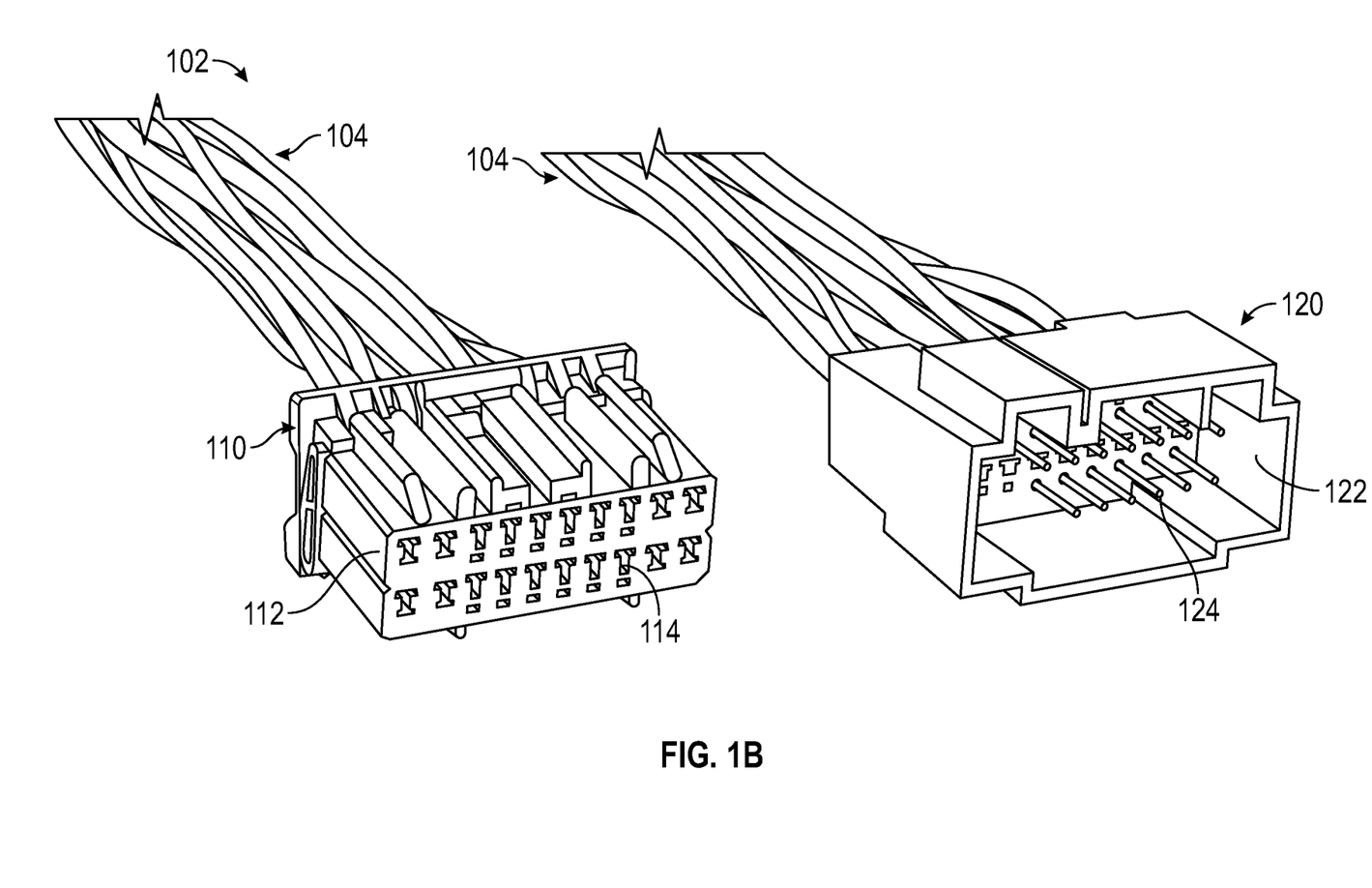
FIG. 1B is a schematic diagram of an electrical connector for use in conjunction with one or more embodiments of the present disclosure.

Referring now to FIG. 1A a schematic diagram of a vehicle 100 for use in conjunction with one or more embodiments of the present disclosure is shown. The vehicle 100 includes a plurality of electrical systems that are used for different purposes, such as autonomous driving, safety monitoring systems, vehicle operational systems, and infotainment systems. Most of the electrical systems in a vehicle 100 include electrical connectors 102, an example of which is illustrated in FIG. 1B. The electrical connectors 102 are configured to easily connect and secure a plurality of wires 104, which is also referred to herein as a cable, to one another. The electrical connectors 102 generally include a male or first housing 110 that is configured to be inserted into a female or second housing 120. Upon inserting the first housing 110 into the second housing 120, a plurality of pins 124 are configured to engage with a plurality of contacts 114. The first housing 110 has an outer surface 112 that is configured to contact an inner surface 122 of the second housing 120. As will be appreciated by those of ordinary skill in the art, the configuration of the electrical connector 102 shown is provided for illustration purposes only and is not intended to be limiting in any way.

Figure 2A:
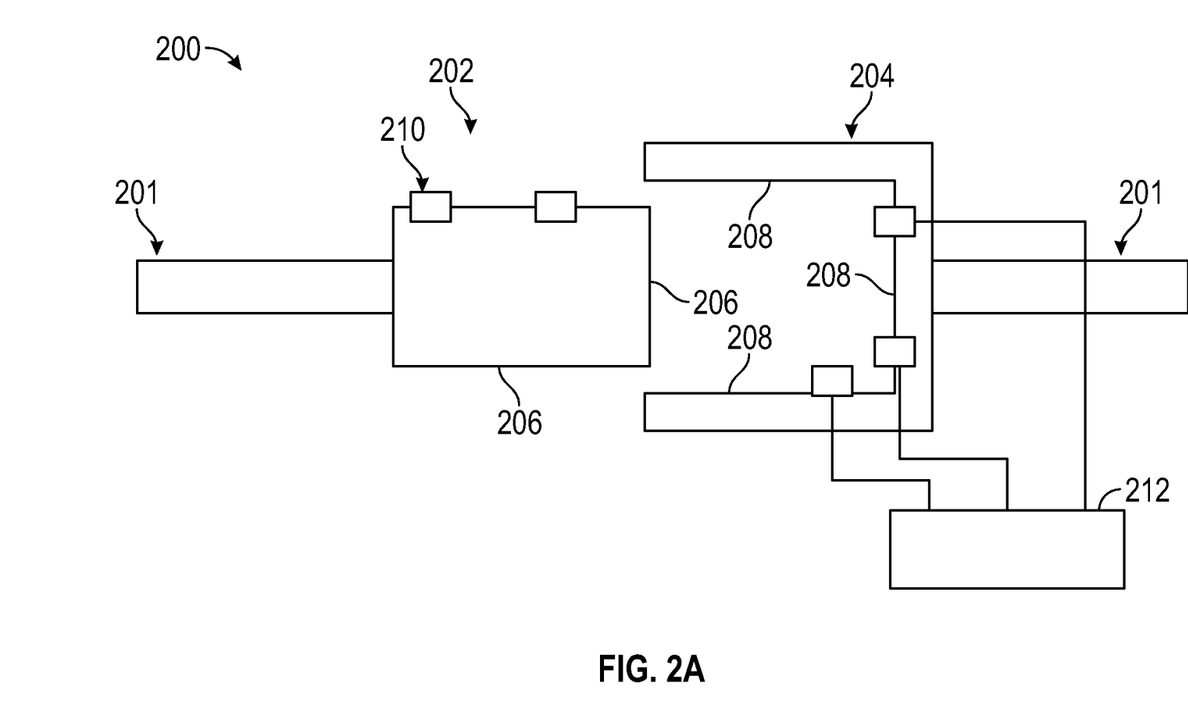
FIGS. 2A and 2B are schematic diagrams illustrating a system for monitoring the position of an electrical connector in accordance with an exemplary embodiment.

Referring now to FIG. 2A, a schematic diagram illustrating a system for monitoring the position of an electrical connector 200 in accordance with an exemplary embodiment is shown. As illustrated, the electrical connector 200 includes a second housing 204 and a first housing 202 that is configured to be inserted into the second housing 204. One or more of the second housing 204 and the first housing 202 may be connected to a cable 201 that includes one or a plurality of wires. In exemplary embodiments, sensors 210 may be disposed on one or more inner surfaces 208 of the second housing 204 and on one or more outer surfaces 206 of the first housing 202. Each of the sensors is configured to monitor contact between the inner surface 208 of the second housing 204 and the outer surface 206 of the first housing 202.

In exemplary embodiments, a controller 212 is configured to receive the readings from the sensors 210 and responsively determine a relative position of the second housing 204 and the first housing 202. In one embodiment, based on a determination that the relative position of the second housing 204 and the first housing 202 indicates that the second housing 204 and the first housing 202 are not fully seated, (i.e., that the second housing 204 and the first housing 202 are at least partially separated from one another), the controller 212 is configured to transmit a warning signal to a vehicle control unit (VCU) (not shown). In one embodiment, the VCU is configured to disable one or more features of the vehicle that rely on the connections provided by the electrical connector 200. In another embodiment, the VCU is configured to reduce the functionality of one or more features of the vehicle that rely on the connections provided by the electrical connector 200. In one embodiment, the VCU may display an indication of the disabled features and/or an indication that the electrical connector 200 has become loose, (i.e., not fully seated).

Figure 2B:
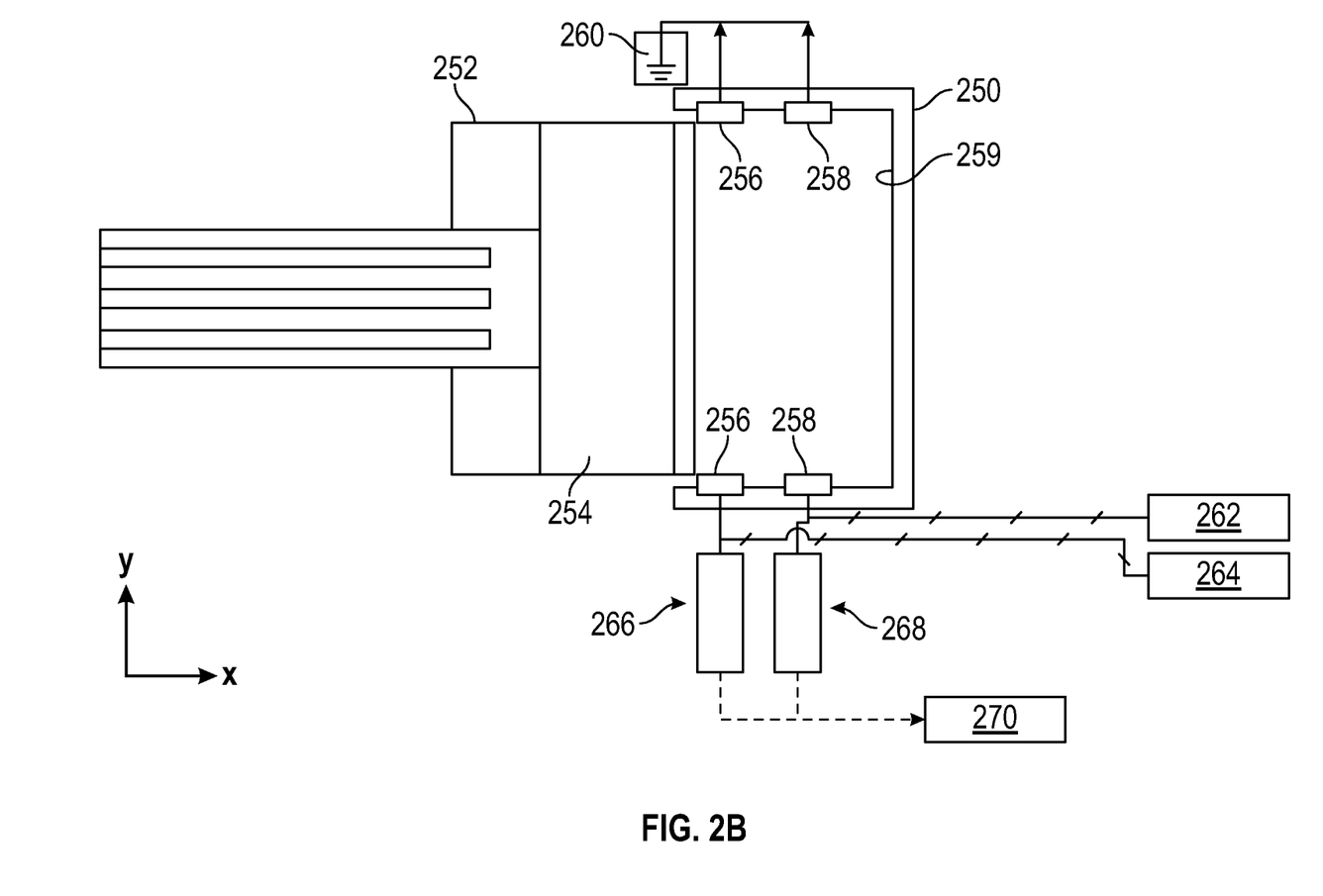

Referring now to FIG. 2B, a schematic diagram illustrating a system for monitoring the position of an electrical connector in accordance with an exemplary embodiment is shown. As illustrated, the electrical connector includes a second housing 250 and a first housing 252 that is configured to be inserted into the second housing 250 in the x-direction. In one embodiment, a portion of the first housing 252 includes a conductive covering 254, such as a ground shield. The inner surface of the second housing 250 includes a first pair of electrical contacts 256 and a second pair of electrical contacts 258. In exemplary embodiments, the second pair of electrical contacts 258 are disposed closer to a rear surface 259 of the second housing 250 than the first pair of electrical contacts 256.

In exemplary embodiments, one of the first pair of electrical contacts 256 and one of the second pair of electrical contacts 258 are connected to ground 260 and the other of the first pair of electrical contacts 256 and the second pair of electrical contacts 258 are connected to a power source 270. In exemplary embodiments, resistors 266 and 268 are respectively disposed between the electrical contacts 256 and 258 and the power source 270. In addition, a first sensor 262 is configured to detect a current flow through resistor 266 and a second sensor 264 is configured to detect a current flow through resistor 268.

In exemplary embodiments, as the first housing 252 is inserted into or removed from the second housing 250, the conductive covering 254 selectively connects one or more of the first pair of electrical contacts 256 and the second pair of electrical contacts 258. As these electrical connections are established or broken, the voltage detected by the first sensor 262 and the second sensor 264 changes. In exemplary embodiments, the voltage levels detected by the first sensor 262 and the second sensor 264 are used to determine the relative position of the first housing 252 and the second housing 250. Although only two pairs of electrical contacts 256, 258 are shown, it will be appreciated by those of ordinary skill in the art that more than two pairs of electrical contacts may be used to provide a more granular measurement of the relative position of the first housing 252 and the second housing 250.

Figure 3A:
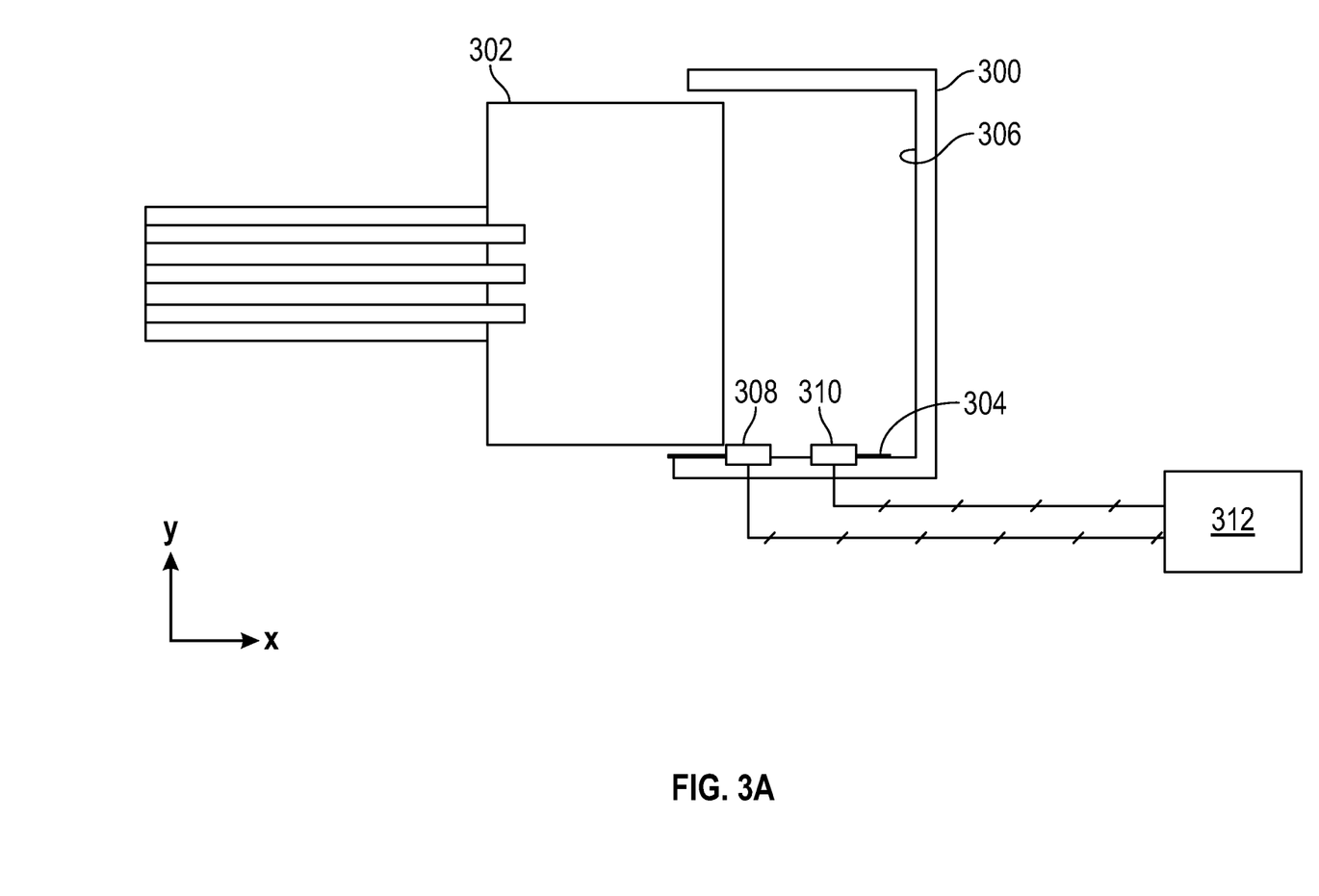
FIGS. 3A and 3B are schematic diagrams illustrating a system for monitoring the position of an electrical connector in accordance with exemplary embodiments.

Referring now to FIG. 3A, a schematic diagram illustrating a system for monitoring the position of an electrical connector in accordance with an exemplary embodiment is shown. The electrical connector includes a second housing 300 and a first housing 302 that is configured to be inserted into the second housing 300 in the x-direction. As illustrated, the second housing 300 includes a first pressure sensor 308 and a second pressure sensor 310 that are disposed on an inner surface 304 of the second housing 300. As illustrated, the second pressure sensor 310 is disposed closer to the rear inner surface 306 of the second housing 300 than the first pressure sensor 308. In exemplary embodiments, the first pressure sensor 308 and the second pressure sensor 310 are in communication with a controller 312 that monitors the readings of the first pressure sensor 308 and the second pressure sensor 310. In exemplary embodiments, based on the readings of the first pressure sensor 308 and the second pressure sensor 310, the controller 312 is configured to determine the relative position of the first housing 302 and the second housing 300. Although only two pressure sensors 308 and 310 are shown, it will be appreciated by those of ordinary skill in the art that more than two pressure sensors may be used to provide a more granular measurement of the relative position of the first housing 302 and the second housing 300.

Figure 3B:
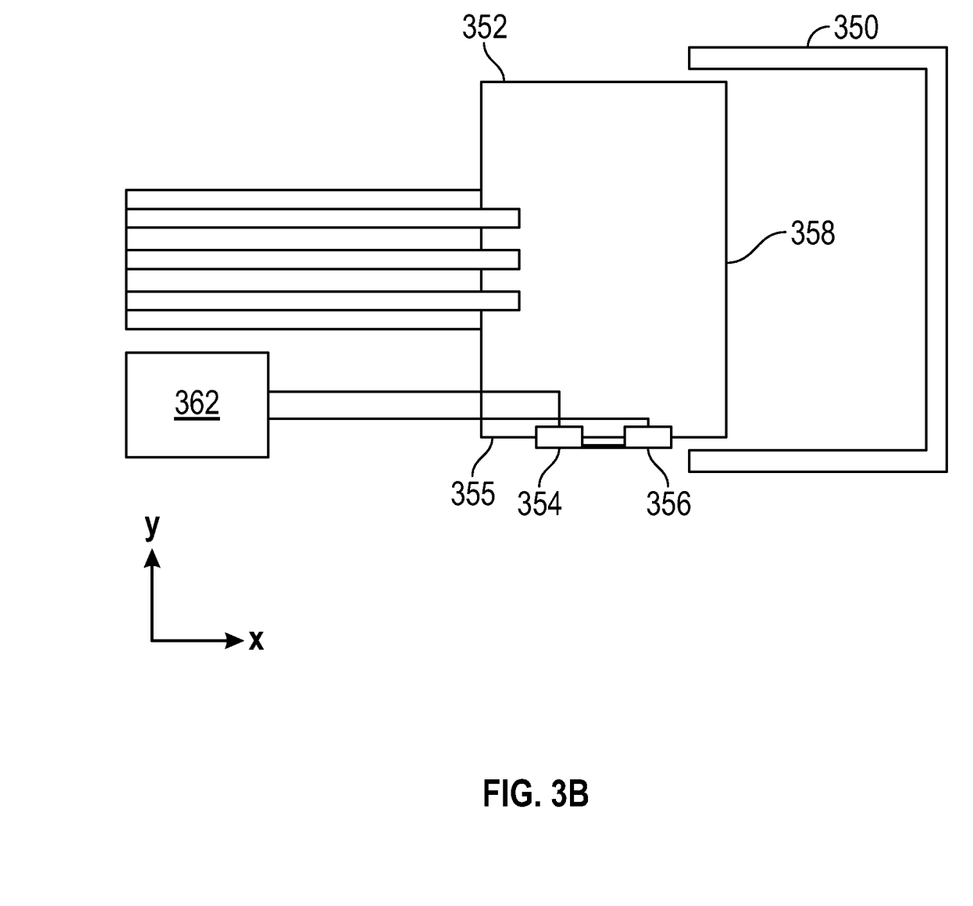

Referring now to FIG. 3B, a schematic diagram illustrating a system for monitoring the position of an electrical connector in accordance with an exemplary embodiment is shown. The electrical connector includes a second housing 350 and a first housing 352 that is configured to be inserted into the second housing 350 in the x-direction. As illustrated, the first housing 352 includes a first pressure sensor 354 and a second pressure sensor 356 that are disposed on an outer surface 355 of the first housing 352. As illustrated, the second pressure sensor 356 is disposed closer to an outer surface 358 of the first housing 352 than the first pressure sensor 354. In exemplary embodiments, the first pressure sensor 354 and the second pressure sensor 356 are in communication with a controller 362 that monitors the readings of the first pressure sensor 354 and the second pressure sensor 356. In exemplary embodiments, based on the readings of the first pressure sensor 354 and the second pressure sensor 356, the controller 362 is configured to determine the relative position of the first housing 352 and the second housing 350. Although only two pressure sensors 354 and 356 are shown, it will be appreciated by those of ordinary skill in the art that more than two pressure sensors may be used to provide a more granular measurement of the relative position of the first housing 352 and the second housing 350.

Figure 4:
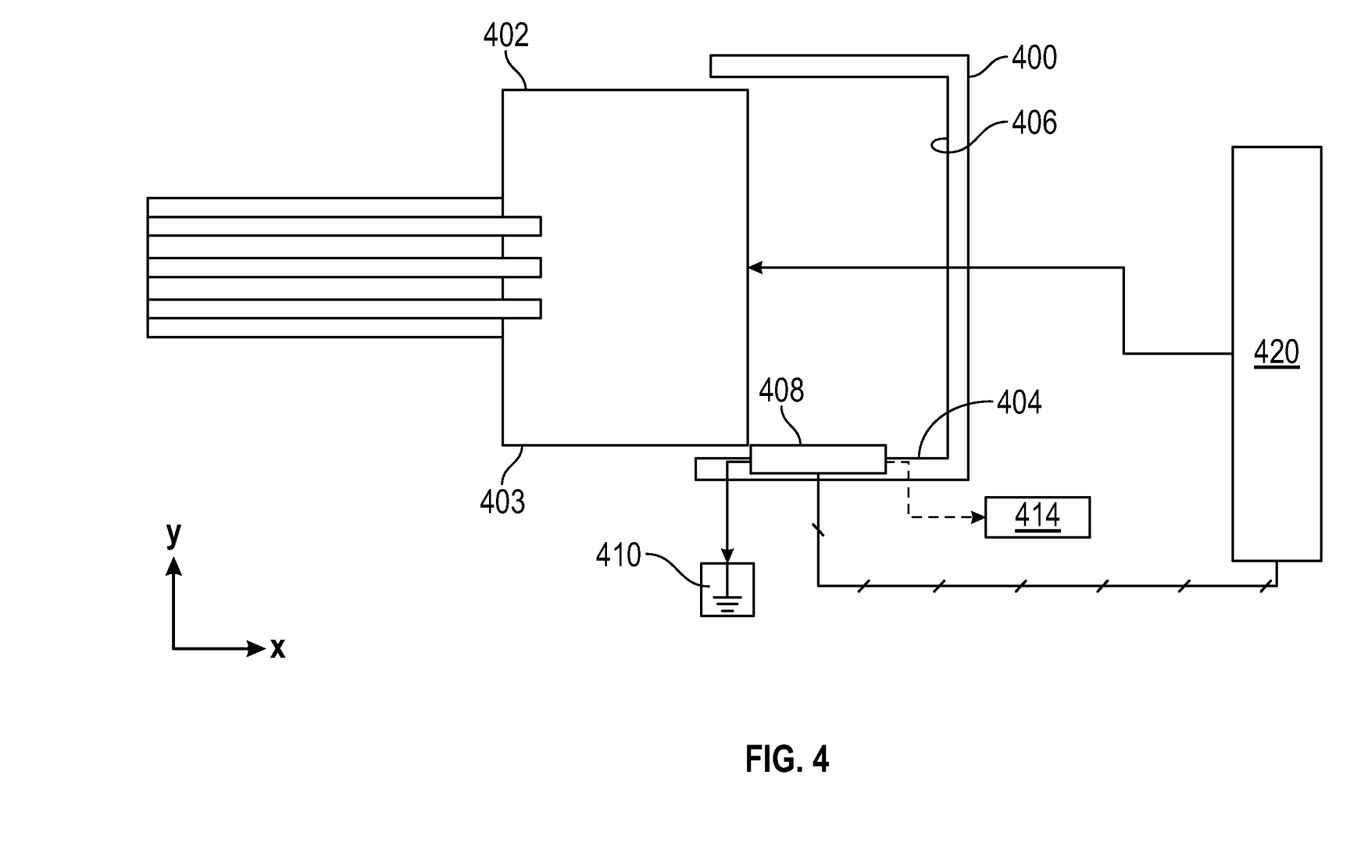
FIG. 4 is a schematic diagram illustrating a system for monitoring the position of an electrical connector in accordance with an exemplary embodiment.

Referring now to FIG. 4, a schematic diagram illustrating a system for monitoring the position of an electrical connector in accordance with an exemplary embodiment is shown. The electrical connector includes a second housing 400 and a first housing 402 that is configured to be inserted into the second housing 400 in the x-direction. As illustrated, the second housing 400 includes a pressure sensor 408 disposed on an inner surface 404. As illustrated, the pressure sensor 408 extends along the inner surface 404 towards a rear inner surface 406 of the second housing 400. In exemplary embodiments, as the first housing 402 is inserted into the second housing 400, an outer surface 403 of the first housing 402 comes into contact with the pressure sensor 408. The further the first housing 402 is inserted into the second housing 400, the surface area of the contact between the outer surface 403 and the pressure sensor 408 increases. As the contact between the outer surface 403 and the pressure sensor 408 increases, the output of the pressure sensor 408 also increases. In one embodiment, the pressure sensor 408 is connected to a power source 414 and optionally to ground 410. In exemplary embodiments, the pressure sensor 408 is in communication with a controller 420 that monitors the readings of the pressure sensor 408. In exemplary embodiments, based on the readings of the pressure sensor 408, the controller 420 is configured to determine the relative position of the first housing 402 and the second housing 400. Although, the pressure sensor 408 is shown as being disposed on an inner surface 404 of the second housing 400, those of ordinary skill in the art will appreciate that the pressure sensor 408 may be disposed on an outer surface 403 of the first housing 402.

Figure 5:
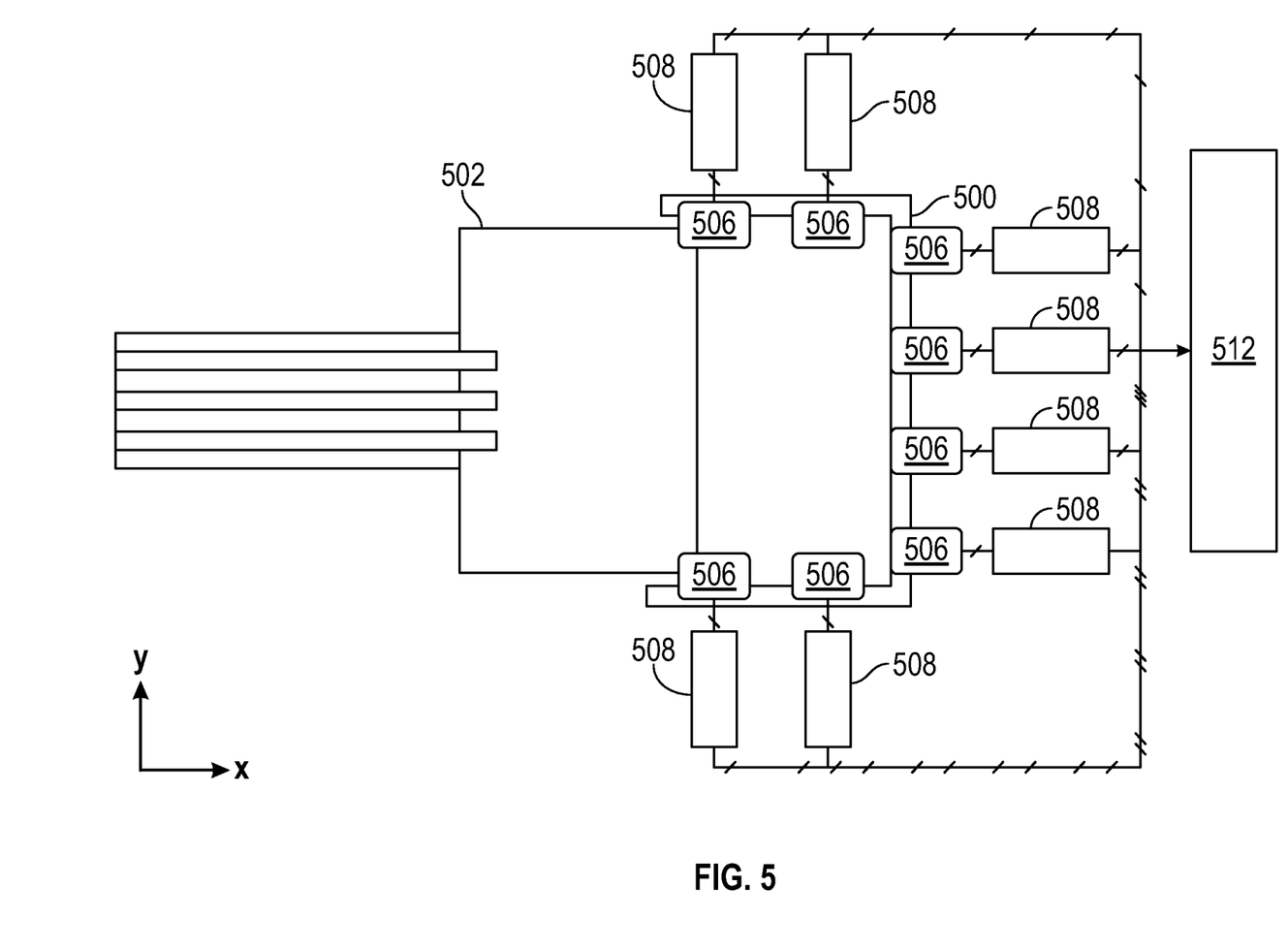
FIG. 5 is a schematic diagram illustrating a system for monitoring the position of an electrical connector in accordance with an exemplary embodiment.

Referring now to FIG. 5, a schematic diagram illustrating a system for monitoring the position of an electrical connector in accordance with an exemplary embodiment is shown. The electrical connector includes a second housing 500 and a first housing 502 that is configured to be inserted into the second housing 500 in the x-direction. As illustrated, the second housing 500 includes a plurality of sensors 506 that are disposed on various inner surfaces of the second housing 500. Each of the plurality of sensors 506 is in communication with a controller 512, which is configured to receive data from each of the sensors 506. Based on the data from the sensors 506, the controller 512 is configured to determine the relative position of the first housing 502 and the second housing 500.

In general, as the housings of the electrical connector begin to separate, there is an intermediate state between fully seated and disconnected where the resistance of the electrical connection is inversely proportional to the amount of metal contact between the connectors. As the pins wiggle out, that resistance goes up until the connectors are separated. In one embodiment, at least one of the sensors 506 is configured as a canary pin. In general, a canary pin is a normal signal pin except the male side is shorter than the rest of the pins and, as a result, the canary pin has a contact area that is less than traditional pins because the insertion depth of the canary pin is shorter. Accordingly, the canary pin will experience higher resistance (due to the limited contact depth) and that resistance will increase as the pin wiggles loose. This wiggling loose will happen on the other pins as well, but because of the higher resistance on the canary pin, it is easier to detect. Furthermore, because the canary pin is shorter, it will disconnect completely while all the other pins are still connected but in a higher resistance state.

In one embodiment, each of the sensors 506 is an electrical contact and a resistor 508 is disposed between each of the sensors 506 and the controller 512. In exemplary embodiments, each of the resistors 508 have unique resistance levels, which helps to identify which sensors are connected/disconnected. In this embodiment, a rear interior surface of the first housing 502 includes a conductive surface that is configured to contact one or more of the sensors 506 when the first housing 502 is fully seated within the second housing 500. In exemplary embodiments, the controller 512 is configured to measure a voltage at each sensor 506 to determine the relative position of the first housing 502 and the second housing 500.

Figure 6:
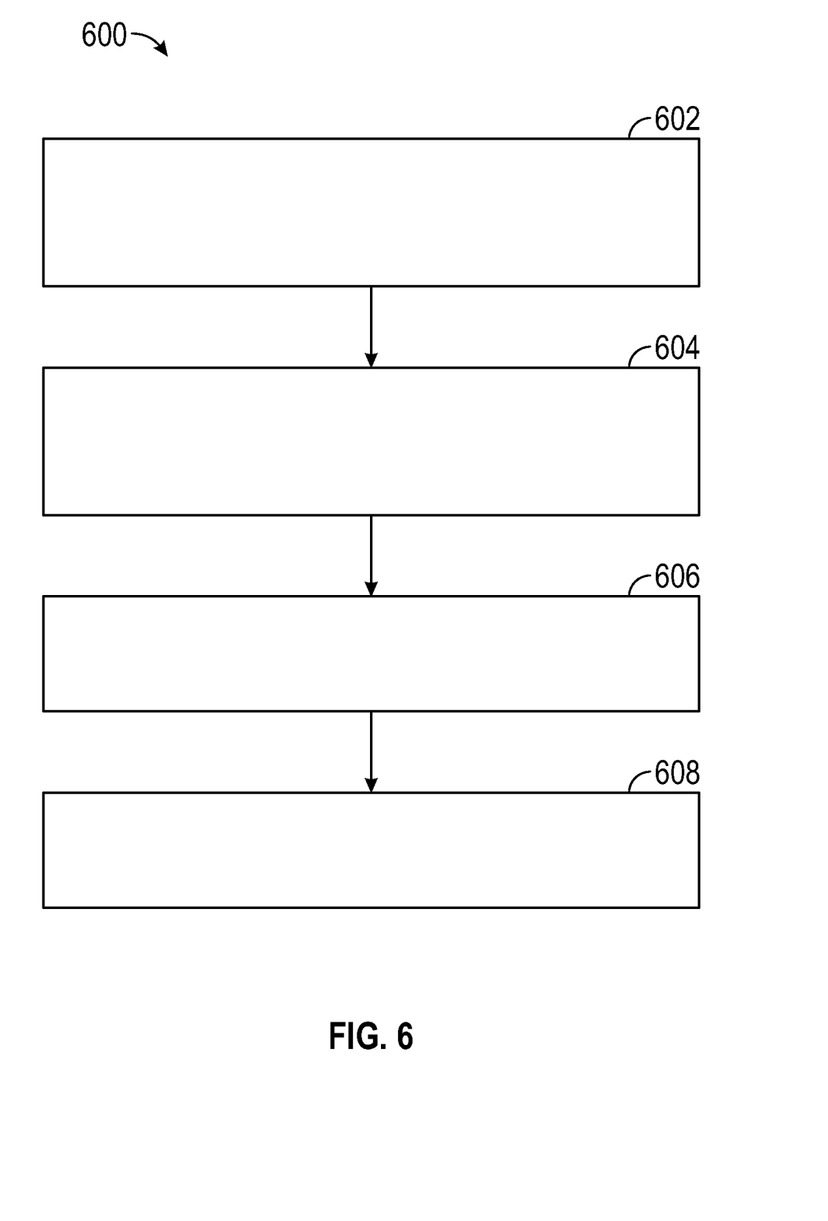
FIG. 6 is a flow chart diagram illustrating a method for monitoring the position of an electrical connector in accordance with an exemplary embodiment.

Referring now to FIG. 6, a flowchart illustrating a method 600 for monitoring the position of an electrical connector of a vehicle in accordance with an exemplary embodiment is shown. The electrical connector includes a second housing configured to receive a first housing. At block 602, the method 600 includes receiving a first signal from a first sensor configured to monitor contact between an inner surface of the second housing and an outer surface of the first housing. Next, at block 604, the method 600 includes receiving a second signal from a second sensor configured to monitor contact between an inner surface of the second housing and an outer surface of the first housing. In exemplary embodiments, the first sensor is disposed closer to a rear inner surface of the second housing than the second sensor.

At block 606, the method 600 includes determining a position of the first housing relative to the second housing based on the first signal and the second signal. Next, at block 608, the method 600 includes transmitting an alert based on a determination that the first housing is not fully inserted into the second housing. In one embodiment, the electrical connector is disposed in a vehicle and the method includes disabling or reducing of at least one feature of the vehicle based on a determination that the first housing is not fully inserted into the second housing.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electrical connector comprising:
   a first housing having an outer surface;
   a second housing configured to receive the first housing, wherein the second housing includes an inner surface configured to contact the outer surface of the first housing;
   a plurality of sensors configured to monitor a contact between the inner surface and the outer surface; and
   a controller in communication with the plurality of sensors, wherein the controller is configured to determine a relative position of the first housing relative to the second housing,
   wherein at least one of the plurality of sensors is a pressure sensor disposed on the inner surface and that extends along the inner surface towards a rear inner surface of the second housing,
   wherein an output of the pressure sensor increases as a surface area of the contact between the outer surface and the pressure sensor increases as the first housing is inserted into the second housing, and
   wherein the controller is configured to determine the relative position of the first housing and the second housing based at least in part on the output of the pressure sensor.

2. The electrical connector of claim 1, wherein at least one of the plurality of sensors is disposed on the inner surface.

3. The electrical connector of claim 1, wherein at least one of the plurality of sensors is disposed on the outer surface.

4. The electrical connector of claim 1, wherein the plurality of sensors are electrical contacts and wherein the controller is configured to detect a connection between the electrical contacts.

5. The electrical connector of claim 1, further comprising a power source in communication with at least one of the plurality of sensors.

6. The electrical connector of claim 1, wherein the controller is configured to transmit an alert based on a determination that the first housing is not fully inserted into the second housing.

7. A method for monitoring a position of an electrical connector having a second housing configured to receive a first housing, the method comprising:
   receiving a first signal from a first sensor configured to monitor contact between an inner surface of the second housing and an outer surface of the first housing;
   receiving a second signal from a second sensor configured to monitor contact between an inner surface of the second housing and an outer surface of the first housing; and
   determining a relative position of the first housing relative to the second housing based on the first signal and the second signal,
   wherein the first sensor is a pressure sensor disposed on the inner surface and that extends along the inner surface towards a rear inner surface of the second housing,
   wherein an output of the pressure sensor increases as a surface area of the contact between the outer surface and the pressure sensor increases as the first housing is inserted into the second housing, and wherein the relative position of the first housing and the second housing is determined based at least in part on the output of the pressure sensor.

8. The method of claim 7, further comprising transmitting an alert based on a determination that the first housing is not fully inserted into the second housing.

9. The method of claim 7, wherein the electrical connector is disposed in a vehicle.

10. The method of claim 9, further comprising disabling at least one feature of the vehicle based on a determination that the first housing is not fully inserted into the second housing.

11. The method of claim 7, wherein the first sensor is disposed closer to a rear inner surface of the second housing than the second sensor.

12. The method of claim 7, wherein at least one of the first sensor and second sensor are disposed on the inner surface.

13. The method of claim 7, wherein at least one of the first sensor and second sensor are disposed on the outer surface.

14. The method of claim 7, wherein at least one of the first sensor and second sensor are electrical contacts.

15. A vehicle comprising:
an electrical system having an electrical connector, the electrical connector comprising:
a first housing having an outer surface;
a second housing configured to receive the first housing, wherein the second housing includes an inner surface configured to contact the outer surface of the first housing;
a plurality of sensors configured to monitor a contact between the inner surface and the outer surface; and
a controller in communication with the plurality of sensors, wherein the controller is configured to determine a position of the first housing relative to the second housing,
wherein at least one of the plurality of sensors is a pressure sensor disposed on the inner surface and that extends along the inner surface towards a rear inner surface of the second housing,
wherein an output of the pressure sensor increases as a surface area of the contact between the outer surface and the pressure sensor increases as the first housing is inserted into the second housing, and
wherein the controller is configured to determine the relative position of the first housing and the second housing based at least in part on the output of the pressure sensor.

16. The vehicle of claim 15, wherein at least one of the plurality of sensors is disposed on the inner surface.

17. The vehicle of claim 15, wherein at least one of the plurality of sensors is disposed on the outer surface.

18. The vehicle of claim 15, wherein the plurality of sensors are electrical contacts and wherein the controller is configured to detect a connection between the electrical contacts.

19. The vehicle of claim 15, wherein the controller is configured to transmit an alert based on a determination that the first housing is not fully inserted into the second housing.

20. The vehicle of claim 15, further comprising a power source in communication with at least one of the plurality of sensors.

* * * * *